United States Patent
Barbera et al.

(10) Patent No.: US 10,197,163 B2
(45) Date of Patent: Feb. 5, 2019

(54) DYNAMIC SEAL

(71) Applicant: Aktiebolaget SKF, Gothenburg (SE)

(72) Inventors: Stellario Barbera, Hilversum (NL); Warrick Allen, Hilversum (NL)

(73) Assignee: Aktiebolaget SKF, Göteborg (SE)

( * ) Notice: Subject to any disclaimer, the term of this patent is extended or adjusted under 35 U.S.C. 154(b) by 20 days.

(21) Appl. No.: 15/511,884

(22) PCT Filed: Sep. 24, 2014

(86) PCT No.: PCT/EP2014/070410
§ 371 (c)(1),
(2) Date: Mar. 16, 2017

(87) PCT Pub. No.: WO2016/045726
PCT Pub. Date: Mar. 31, 2016

(65) Prior Publication Data
US 2017/0292608 A1    Oct. 12, 2017

(51) Int. Cl.
| | | |
|---|---|---|
| *F16C 33/76* | (2006.01) |
| *F16J 15/324* | (2016.01) |
| *F16J 15/32* | (2016.01) |
| *F16J 15/3204* | (2016.01) |
| *F16C 33/78* | (2006.01) |
| *F16C 19/16* | (2006.01) |

(52) U.S. Cl.
CPC ......... *F16J 15/324* (2013.01); *F16C 33/7823* (2013.01); *F16J 15/32* (2013.01); *F16J 15/3204* (2013.01); *F16C 19/163* (2013.01)

(58) Field of Classification Search
CPC ... F16C 33/7816; F16C 33/7823; F16J 15/16; F16J 15/162; F16J 15/20; F16J 15/32; F16J 15/3204; F16J 15/324; F16J 15/328; F16J 15/3292; F16J 15/3404; F16J 15/3496
See application file for complete search history.

(56) References Cited

U.S. PATENT DOCUMENTS

| | | | |
|---|---|---|---|
| 3,671,048 A * | 6/1972 | Gyory ................. | F16J 15/324 277/569 |
| 4,203,884 A | 5/1980 | Coran et al. | |
| 5,266,626 A | 11/1993 | Hert et al. | |
| 6,228,813 B1 * | 5/2001 | Yabe .................. | C08L 23/06 384/463 |
| 2007/0134411 A1 * | 6/2007 | Cont ................... | B01J 13/02 427/213.34 |

FOREIGN PATENT DOCUMENTS

| | | | |
|---|---|---|---|
| CN | 102439335 A | 5/2012 | |
| CN | 103189552 A | 7/2013 | |
| CN | 103562336 A | 2/2014 | |
| DE | 2714534 A1 | 10/1978 | |
| FR | 2643378 A1 | 8/1990 | |
| JP | 02253061 A * | 10/1990 | ............. F02F 7/006 |

* cited by examiner

*Primary Examiner* — Phillip A Johnson
(74) *Attorney, Agent, or Firm* — Bryan Peckjian; SKF USA Inc. Patent Dept.

(57) ABSTRACT

A dynamic seal having a contact surface providing poly (norbornene) or a derivative thereof.

20 Claims, 2 Drawing Sheets

DYNAMIC SEAL

CROSS REFERENCE TO RELATED APPLICATIONS

This is a United States National Stage Application claiming the benefit of International Application Number PCT/EP2014/070410 filed on Sep. 24, 2014 which is incorporated herein by reference in its entirety.

FIELD OF THE INVENTION

The present invention relates generally to the field of seals and, in particular, to an improved dynamic seal. Such a dynamic seal may find use, for example, in a rolling element bearing.

BACKGROUND OF THE INVENTION

Seals are used to prevent leakage between two environments. Seals can be used, for example, to retain a fluid, separate fluids or to prevent the transmission of particulate contaminants from one environment to another.

Dynamic seals are used to seal passages between machine components that move relative to each other, either linearly or in the circumferential direction. There are various types of dynamic seals, including packing and piston seal rings, which are used for linear or oscillating movements. However, the most common seal is the radial shaft seal, which is used in a wide variety of applications in all branches of industry.

Dynamic seals are employed to retain lubricant, prevent water ingress and to prevent particulate, such as grit, contamination of the contact surfaces between the machine components (for example, the contact surfaces between the rolling elements and inner and/or outer rings of a rolling element bearing). However, as will be appreciated, friction during use leads to wear on the seal which will eventually lead to failure of the seal. In addition, the friction may reduce the efficiency of the device in which the dynamic seal is employed. For example, high levels of friction are generated within a shaft bearing as a result of the intimate contact between the surfaces of the metal shaft and the rubber bearing seal itself. Accordingly, there is a need for a dynamic seal (such as a dynamic bearing seal) exhibiting a low coefficient of friction. Such a seal would result in substantial energy savings, and would also be less likely to fail prematurely due to accelerated heat ageing of the seal.

Elastomer seals have remained popular for a number of dynamic sealing applications by virtue of a number of beneficial properties including good sealing performance, resistance to oils at elevated temperatures and low cost. However, one drawback is the necessity to maintain constant lubrication to avoid the high friction experienced when elastomers are run dry or in a starved condition. Traditionally, two alternative methods of lubrication are adopted for such seals: oil lubrication and grease lubrication. Oil lubrication enables the seal to be run at higher speeds with typically lower friction. However, it also necessitates the use of a more elaborate and expensive pumping system in order to ensure that a layer of lubricating oil is maintained at the contact surface. Grease lubrication offers lower cost and convenience but typically offers a slightly lower performance and may require changing during the lifetime. Grease systems commonly show a limited lifetime as a consequence of the grease being mobile in the vicinity of the sealing surface causing eventual starvation of lubricant.

There is a desire for a seal that will overcome, or at least mitigate, some or all of the problems associated with the seals of the prior art or at least a useful or optimized alternative.

BRIEF SUMMARY OF THE INVENTION

In a first aspect, the present invention provides a dynamic seal having a contact surface comprising poly(norbornene) or a derivative thereof.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

The term "dynamic seal" as used herein encompasses a seal to be used in contact with sliding surfaces. Dynamic seals are used to seal passages between machine components that move relative to each other either linearly or in the circumferential direction. A dynamic seal is a structure for hindering or substantially preventing egress of lubricant and/or ingress of foreign bodies.

The term "contact surface" used herein with regard to a dynamic seal encompasses a surface which, in use, is in sliding sealing contact with a counter surface.

The term "poly(norbornene)" used herein encompasses a polymer having the chemical formula:

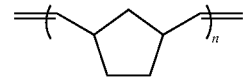

The inventors have surprisingly found that the dynamic seal of the present invention exhibits a low working friction.

Prior to use, the dynamic seal is loaded with a lubricant, typically oil, to lubricate the relative motion of the dynamic seal with the sliding surfaces (for example, the inner or outer ring of a rolling element bearing). In use, such relative motion may cause lubricant to become distributed away from the contact surface between the dynamic seal and the sliding surfaces.

The dynamic seal has a contact surface comprising poly (norbornene) or a derivative thereof. Suitable poly(norbornene) derivatives include, for example, poly(norbornadiene). References to poly(norbornene) in the following description refer to both poly(norbornene) and poly(norbornene) derivatives.

Poly(norbornene) is oleophilic, and when contacted with lubricant oil forms a gel-like material similar to grease. Without being bound by theory, it is considered that there is a strong interaction between poly(norbornene) and the large alkyl groups typically present in lubricating oils (for example poly alpha olefin oils). This may lead to a large number of Van der Waals' type attractive forces between the oil molecules and the poly(norbornene). Accordingly, in use, when the dynamic seal is loaded with lubricating oil, the poly(norbornene) at the contact surface may maintain a lubricating layer of oil molecules at the contact surface. In other words, the seal works in a similar fashion to a grease-lubricated seal, but has a key advantage that the lubricating layer is static holding the base oil within the direct vicinity of the sealing surface. As a result, the friction of the dynamic seal is reduced, thereby increasing the working lifetime of the dynamic seal and reducing the energy required to cause relative motion of the sliding surfaces. The reduced friction may be exhibited over a wide range of operating temperatures and operating speeds. The reduced friction may be particularly pronounced at low speeds. Accordingly, the dynamic seal may be advantageously used for low speed and static friction applications. For example, the dynamic seal may be particularly useful to reduce the initial friction experienced at "start-up" of a machine, i.e. when progressing from static to a slow speed. In addition, there may be no need to replace the lubricating oil during its working lifetime.

The poly(norbornene) may advantageously release lubricant oil in use, for example at typical working pressures of dynamic seals.

The poly(norbornene) may to some extent function as a lubricant itself.

The poly(norbornene) may provide cis-poly(norbornene) and/or trans-poly(norbornene). The poly(norbornene) typically provides trans-poly(norbornene), more typically from about 85 to about 95 wt. % trans-poly(norbornene), even more typically about 90 wt. % trans-poly(norbornene).

The poly(norbornene) typically has a high molecular weight, for example a weight average molecular weight of >1,000,000. Poly(norbornene) is typically made from catalytic polymerisation of 2-norbornene. Poly(norbornene) is highly absorbing of oils, typically capable of absorbing 10 times its weight or more of lubricant oil.

Poly(norbornene) is advantageously non-toxic, non-mutagenic, non-corrosive and non-hazardous.

The dynamic seal may be used to seal passages between machine components that move relative to each other, either linearly or in the circumferential direction. The dynamic seal may be, for example, an engine seal (such as, for example, a valve stem seal, a crankshaft seal or a shaft seal), an O-ring seal, a steering seal, a suspension seal, a piston seal, a wheel end seal, a power transmission seal, a pneumatic seal, a hydraulic seal, a fluid handing seals or an aerospace shaft seal.

The dynamic seal may be formed of any suitable material, for example, metal or alloys such as steel, a polymeric material and/or an elastomeric material. A preferred material is an elastomer. Suitable elastomers include, for example, fluoroelastomers (FKM), perfluoroelastomers (FFKM), nitrile butadiene rubber (NBR), hydrogenated nitrile butadiene rubber (HNBR), carboxylated nitrile butadiene rubber (XNBR), silicone (VMQ), polyurethane (PU), thermoplastic polyurethane (TPU) and thermoplastic elastomers (TPE). The dynamic seal may be a lip seal comprising, for example, a seal body (formed of, for example, metal) and a seal lip (formed of, for example, an elastomer). Such materials may provide good sealing performance and high resistance to lubricating oils at elevated temperature, and are low cost.

The dynamic seal may be formed entirely of poly(norbornene). The dynamic seal may be formed of a mixture of poly(norbornene) and other materials, such as, for example, one or more elastomers. Alternatively, poly(norbornene) may be provided only at the contact surface of the dynamic seal, for example, in the form of a layer or coating. This may be advantageous, since the presence of poly(norbornene) in the main body of the dynamic seal may reduce the strength of the dynamic seal. In particular, the poly(norbornene) may exhibit low strength when in the oil-swelled condition.

The poly(norbornene) at the contact surface may be provided in the form of, for example, a film (e.g. a continuous film) or a particulate (e.g. a powder). The poly(norbornene) may be applied to the contact surface using any suitable application technique such as, for example, dipping, spraying, coating, partial coating and/or the formation of an intermediate layer (e.g. the formation of a layer having poly(norbornene) at the surface thereof, followed by attachment of the layer to the contact surface).

The poly(norbornene) is preferably provided in the form of a particulate (e.g. a powder). This may result in the poly(norbornene) having a high surface area at the contact surface. Accordingly, the ability of the poly(norbornene) to retain lubricating oil at the contact surface is increased. An example of a poly(norbornene) particulate suitable for use in the present invention is NORSOREX® APX (Astrotech Advanced Elastomer products GmbH). The particulate may contain species other than poly(norbornene) such as, for example, an antioxidant (e.g. a phenolic antioxidant) and/or a flow agent.

The particulate is typically disposed on the contact surface of the dynamic seal as a continuous strip along the outer circumference of the dynamic seal. Alternatively, the particulate may be disposed over substantially the entire surface of the dynamic seal. The particulate may be applied by, for example, dipping and/or spraying.

A majority of the particles making up the particulate preferably have a longest dimension of from 1 to 500 microns, more preferably from 50 to 200 microns, even more preferably from 100 to 150 microns, still even more preferably about 125 microns. Such a particle size provides a particularly favourable surface area. Particles with longest dimensions smaller than 1 micron may be difficult to handle and may disperse more easily into the oil. Such a mean longest dimension may be obtained, for example, by sieving. The mean longest dimension may be confirmed, for example, by optical or electron microscopy. When the particles are in the form of spheres, the longest dimension is the diameter of the sphere. Typically substantially all of the particles making up the particulate preferably have a longest dimension within the above recited ranges.

The poly(norbornene) may be attached to the contact surface of the dynamic seal using any suitable bonding or joining technique. For example, an adhesive may be used, either to attach the poly(norbornene) to the contact surface or to attach an intermediate layer (see above) to the contact surface. Alternatively, the poly(norbornene) may be partially embedded in the contact surface, for example by melting and/or softening the material of the dynamic seal at the contact surface.

The poly(norbornene) is preferably attached to the contact surface of the dynamic seal using an adhesive. The choice of adhesive will depend on the nature of the underlying seal material (for example metal, alloy, polymer or elastomer) and the poly(norbornene), but in all cases it is chosen to ensure a strong bond between the underlying seal material and the poly(norbornene). For polymeric or elastomeric seal materials, a suitable adhesive is a cyanoacrylate adhesive and/or a water-based polyurethane adhesive. Such adhesives can be used to bond the poly(norbornene) to the dynamic seal at its contact surface, i.e. the surface of the seal which will be in sliding contact with the sliding surfaces.

The dynamic seal preferably provides an elastomer. For example, the main body of the dynamic seal may provide an elastomer with the contact surface comprising the poly (norbornene), for example particulate poly(norbornene). Elastomers may provide the dynamic seal with high levels of resilience, thereby ensuring favourable dynamic sealing. A preferred elastomer is a fluoroelastomer, for example a perfluoroelastomer. The combination of the fluoroelastomer (e.g. perfluoroelastomer) forming the main body and/or lip of the seal, and the contact surface comprising poly(norbornene), for example particulate poly(norbornene), is particularly preferred. The fluoroelastomer may be relatively oleophobic, and may therefore direct lubricant oil toward the contact surface.

In a further aspect, the present invention provides a bearing comprising the dynamic seal as described herein.

The inventors have surprisingly found that the bearing exhibits a low working friction. The bearing may be, for example, a plain bearing or a rolling element bearing.

In a further aspect, the present invention provides a rolling element bearing comprising:

an inner ring;
an outer ring;
a plurality of rolling elements disposed between an outer surface of the inner ring and an inner surface of the outer ring; and
a dynamic seal as described herein, wherein the contact surface of the dynamic seal is arranged to be in sliding contact with the inner ring or the outer ring, in use.

The inventors have surprisingly found that the rolling element bearing of the present invention exhibits a low working friction.

The dynamic seal typically extends from the inner ring to the outer ring and provides an annular surface that faces the plurality of rolling elements. The dynamic seal may be attached to the outer ring of the bearing. In this case, in use, the contact surface (typically the radially innermost edge) of the dynamic seal will be in rotational sliding sealing contact with the inner ring. Alternatively, the dynamic seal may be attached to the inner ring of the bearing. In this case, in use, the contact surface (typically the radially outermost edge) of the dynamic seal will be in rotational sliding sealing contact with the outer ring. The bearing preferably provides a dynamic seal positioned each side of the rolling elements in the axial direction.

Prior to use, the bearing is loaded with a lubricant, typically oil, to lubricate the relative motion of the dynamic seal with the inner ring or outer ring. In use, such relative motion, particularly at high speed, may cause lubricant to become distributed away from the contact surface between the dynamic seal with the inner ring or outer ring The poly(norbornene) is oleophilic. Accordingly, in use, when the bearing is loaded with lubricating oil, the poly (norbornene) at the contact surface may maintain a lubricating layer of oil molecules at the contact surface. As a result, the friction of the bearing is reduced, thereby reducing the working torque and increasing the working lifetime of the bearing. The reduced friction may be exhibited over a wide range of operating temperatures and operating speeds. In addition, there may be no need to replace the lubricating oil during its working lifetime.

The inner ring typically sits concentrically within the outer ring. One or both of the inner and outer rings will typically be formed of a bearing steel. Examples of bearing steels include: through-hardened carbon chromium steel (100Cr6) containing approximately 1% carbon and 1.5% chromium according to ISO 683-17:1999; chromium-nickel and manganese-chromium alloyed steels according to ISO 683-17:1999 with a carbon content of approximately 0.15%; high chromium
content steels X65Cr14 according to ISO 683-17:1999 and X105CrMo17 according to EN 10088-1:1995; and highly alloyed steels such as 80MoCrV42-16 manufactured to ISO 683-17:1999.

The rolling elements may provide, for example, balls, rollers, discs and/or tapered rolling elements. These may be formed from, for example, a bearing steel as herein described or, alternatively, from a ceramic material such as silicon nitride.

The dynamic seal in the bearing may be annular in shape. Alternatively, the dynamic seal may be, for example, in the shape of a disk or hemisphere.

The contact surface of the dynamic seal may be loaded with lubricant oil to lubricate the relative motion of the dynamic seal with either the inner ring or the outer ring.

BRIEF DESCRIPTION OF THE SEVERAL VIEWS OF THE DRAWING

The present invention will now be described further, by way of example, with reference to the following non-limiting drawings in which.

DETAILED DESCRIPTION OF THE INVENTION

The invention will now be described with reference to the Figures and the following non-limiting Examples.

Figure 1:
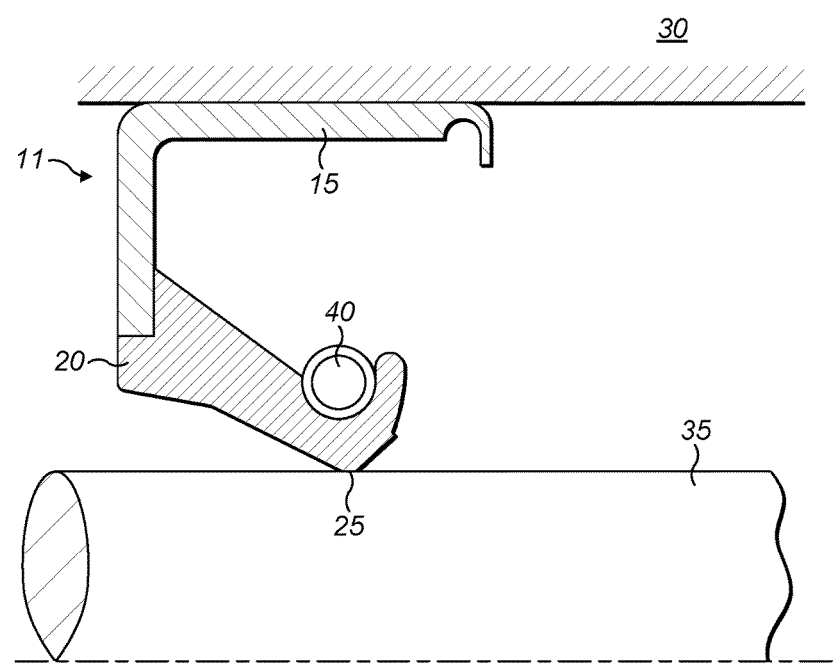
FIG. 1 shows a cross-sectional view of part of a seal according to the invention.

FIG. 1 shows an example of a shaft seal 11 comprising a metal casing 15 to which an elastomeric sealing lip 20 has been bonded. The sealing lip 20 is formed of an elastomer. The seal is mounted in an annular gap between the bore of a bearing housing 30 and a shaft 35, whereby the sealing lip 20 has a contact surface 25 which bears against a counter-face on the shaft 35. To ensure that the lip remains in contact with the shaft, the lip is preloaded with a garter spring 40. The contact surface 25 is provided with poly(norbornene) (not shown).

Figure 2:
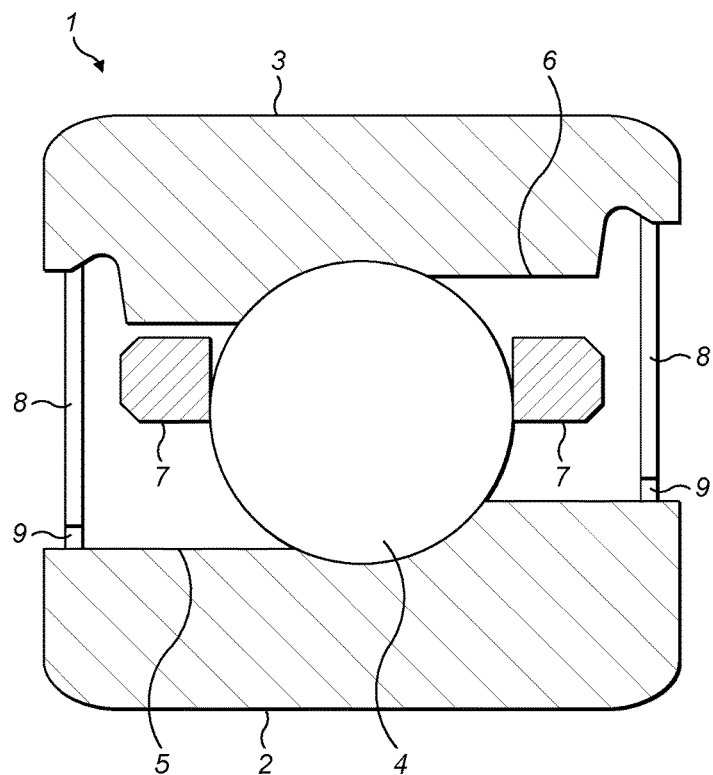
FIG. 2 shows a cross-sectional view of part of a rolling element bearing according to the present invention.
Figure 3:
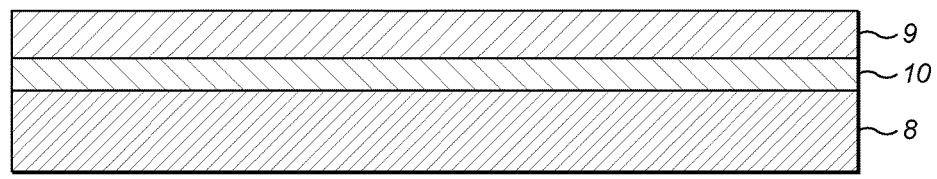
FIG. 3 shows a cross-sectional view of part of a bearing seal according to the present invention.

Referring to FIGS. 2 and 3, an embodiment of a rolling element bearing 1 in accordance with the present invention is shown comprising an inner ring 2, an outer ring 3 and a plurality of rolling elements 4 (in this case a ball, only one rolling element shown) disposed between an outer surface 5 of the inner ring 2 and an inner surface 6 of the outer ring 3. The rolling elements 4 are preferably contained in a ball cage 7.

The rolling element bearing 1 has bearing seals 8 positioned either side of the rolling elements 4 in the axial direction. The bearing seals extend from the outer ring to the inner ring. A contact surface at the radially innermost edge of each bearing seal 8 is provided with a poly(norbornene) layer 9 in sliding contact with an outer surface 5 of the inner ring 2.

FIG. 3 shows a close-up of the contact surface of the bearing seal 8 of the rolling element bearing 1 shown in FIG. 2. As shown in FIG. 3, poly(norbornene) layer 9 (shown as a layer or coating, but as noted above will preferably be in the form of a particulate, e.g. a powder) is bonded to bearing seal 8 by an adhesive layer 10.

Prior to use, the bearing may be loaded with lubricating oil (not shown). In use, due to its oleophilic nature, poly (norbornene) layer 9 forms a gel-like material with the lubricating oil. This serves to maintain a layer of lubricating oil between the bearing seal 8 and the outer surface 5 of the inner ring 2, thereby reducing friction between the bearing seal 8 and the outer surface 5 of the inner ring 2.

While the bearing 1 shown in FIG. 2 is asymmetric (for reasons of ease of assembly), this is not essential, and the invention may be applied to other types of bearing 1, including symmetric and/or split types.

EXAMPLE 1

A poly(norbornene)-based powder, NORSOREX® APX (Astrotech Advanced Elastomerproducts GmbH), in dry form, was filtered to a particle size of <125 μm using a sieve to produce a fine, off-white powder. The surface of an FKM elastomer test ring of diameter ~5 cm and 2 mm surface contact width was coated in a suitable water-based poly(urethane) dispersion coating to produce a wet coating of ~0.5 mm thickness on the surface of the elastomer test ring. The coated ring was then contacted gently onto a layer of the filtered poly(norbornene)-based powder that had been spread evenly across a flat container so that powder was allowed to adhere to the surface; this was repeated several times to try and obtain full powder coverage of the test ring surface with loose powder removed by gentle tapping. After this the adhesive was allowed to dry and cure by leaving the sample at ambient temperature for one week.

The particulate coated surface of the test ring was then placed in a shallow bath of clean semi-synthetic engine oil (5W-30) for 30 minutes to allow saturation of the oil absorbing polymer with the oil. After this the excess oil was wiped away and any residual oil left on the surface was removed by contacting the coated surface on a surfactant free tissue several times until oil residue could not be seen on the tissue paper.

The dynamic friction of the test ring was then tested in a tribometer (CETR UMT-3) at 25° C. and 0.2 MPa contact pressure for a series of increasing rotational speeds at 10 rpm, 20 rpm, 50 rpm, 100 rpm, 200 rpm, 500 rpm, 1000 rpm and 2000 rpm for 30 seconds each. This sequence was then run in reverse order to 20 rpm under the same conditions. Prior to testing for different speeds the sample was run in for several minutes at ambient and 0.2 MPa at 100 rpm. Testing of the sample was repeated with data measured between a duration of 10-30 s of each test speed. An average of the coefficient of dynamic friction (dynamic COF) together with the range between the highest and lowest values was recorded. The results are set out in Table 1 below.

TABLE 1

Example 1 - Oil saturated oleophilic polymer coating (contact pressure = 0.2 MPa).

| | Dynamic COF | |
|---|---|---|
| | Average | Range |
| rpm (ascending) | | |
| 10 | 0.17 | 0.14-0.20 |
| 20 | 0.16 | 0.14-0.19 |
| 50 | 0.17 | 0.16-0.19 |
| 100 | 0.18 | 0.16-0.20 |
| 200 | 0.20 | 0.18-0.23 |
| 500 | 0.24 | 0.21-0.27 |
| 1000 | 0.28 | 0.25-0.30 |
| 2000 | 0.29 | 0.26-0.32 |
| rpm (descending) | | |
| 1000 | 0.28 | 0.26-0.31 |
| 500 | 0.29 | 0.24-0.34 |
| 200 | 0.22 | 0.20-0.25 |
| 100 | 0.20 | 0.17-0.23 |

TABLE 1-continued

Example 1 - Oil saturated oleophilic polymer coating (contact pressure = 0.2 MPa).

| | Dynamic COF | |
|---|---|---|
| | Average | Range |
| 50 | 0.19 | 0.16-0.21 |
| 20 | 0.18 | 0.15-0.21 |

COMPARATIVE EXAMPLE 1

An FKM reference sample of identical dimensions without a coating was tested and under the same conditions using only lubrication with a premium, mineral oil based grease at 0.2 MPa and 0.5 MPa contact pressures. The results are set out in Tables 2 and 3 below.

TABLE 2

Comparative Example 1 - FKM elastomer with premium, mineral oil based grease (contact pressure = 0.2 MPa).

| | Dynamic COF | |
|---|---|---|
| | Average | Range |
| rpm (ascending) | | |
| 10 | 0.34 | 0.31-0.36 |
| 20 | 0.37 | 0.34-0.42 |
| 50 | 0.35 | 0.34-0.36 |
| 100 | 0.47 | 0.42-0.49 |
| 200 | 0.63 | 0.51-0.70 |
| 500 | 0.73 | 0.64-0.82 |
| 1000 | 0.61 | 0.60-0.63 |
| 2000 | 0.47 | 0.43-0.51 |
| rpm (descending) | | |
| 1000 | 0.54 | 0.52-0.55 |
| 500 | 0.72 | 0.70-0.74 |
| 200 | 0.50 | 0.48-0.52 |
| 100 | 0.38 | 0.36-0.39 |
| 50 | 0.31 | 0.30-0.31 |
| 20 | 0.30 | 0.28-0.31 |

TABLE 3

Comparative Example 1 - FKM elastomer with a premium, mineral oil based grease (contact pressure = 0.5 MPa).

| | Dynamic COF | |
|---|---|---|
| | Average | Range |
| rpm (ascending) | | |
| 10 | 0.27 | 0.24-0.3 |
| 20 | 0.26 | 0.24-0.27 |
| 50 | 0.27 | 0.25-0.29 |
| 100 | 0.29 | 0.28-0.32 |
| 200 | 0.33 | 0.34-0.36 |
| 500 | 0.34 | 0.34-0.36 |
| 1000 | 0.35 | 0.34-0.35 |
| 2000 | 0.30 | 0.29-0.31 |
| rpm (descending) | | |
| 1000 | 0.29 | 0.28-0.29 |
| 500 | 0.28 | 0.27-0.28 |
| 200 | 0.26 | 0.24-0.27 |
| 100 | 0.25 | 0.24-0.26 |
| 50 | 0.25 | 0.24-0.26 |
| 20 | 0.23 | 0.23-0.24 |

It can be seen that the dynamic coefficient of friction of Comparative Example 1 is higher than that of Example 1 over a range of speeds and pressures

EXAMPLE 2

An oil absorbing coating on an FKM test ring was made using identical materials and conditions to those used for Example 1. A fully synthetic, 5W-30 grade oil was instead used to lubricate the polymer coating for 30 minutes to allow saturation of the oil absorbing polymer with the oil. After this the excess oil was wiped away and any excess left on the surface was removed by contacting the coated surface on a surfactant free tissue several times until oil residue could not be seen on the tissue paper. The dynamic friction of the test ring was then tested using the same protocol as for Example 1. The results are shown in Table 4 below.

TABLE 4

Example 2 - Oil saturated oleophilic polymer coating (contact pressure = 0.2 MPa).

| | Dynamic COF | |
|---|---|---|
| | Average | Range |
| rpm (ascending) | | |
| 10 | 0.16 | 0.15-0.17 |
| 20 | 0.16 | 0.15-0.16 |
| 50 | 0.16 | 0.15-0.16 |
| 100 | 0.17 | 0.16-0.17 |
| 200 | 0.18 | 0.17-0.19 |
| 500 | 0.22 | 0.20-0.24 |
| 1000 | 0.25 | 0.21-0.27 |
| 2000 | 0.29 | 0.24-0.33 |
| rpm (descending) | | |
| 1000 | 0.33 | 0.30-0.40 |
| 500 | 0.31 | 0.31-0.32 |
| 200 | 0.24 | 0.24-0.26 |
| 100 | 0.19 | 0.19-0.20 |
| 50 | 0.16 | 0.16-0.17 |
| 20 | 0.16 | 0.16-0.17 |

COMPARATIVE EXAMPLE 2

An FKM reference sample of identical dimensions to Example 2 but without a coating was tested and under the same conditions using only lubrication with a synthetic 5W-30 engine oil (the same lubrication as Example 2) at 0.2 MPa and 0.5 MPa contact pressures. The results are set out in Tables 5 and 6 below.

TABLE 5

Comparative Example 2 - FKM elastomer with fully synthetic 5W-30 engine oil (contact pressure = 0.5 MPa).

| | Dynamic COF | |
|---|---|---|
| | Average | Range |
| rpm (ascending) | | |
| 10 | 0.42 | 0.39-0.46 |
| 20 | 0.38 | 0.37-0.39 |
| 50 | 0.34 | 0.33-0.35 |
| 100 | 0.32 | 0.32-0.33 |
| 200 | 0.33 | 0.32-0.34 |
| 500 | 0.35 | 0.34-0.36 |

TABLE 5-continued

Comparative Example 2 - FKM elastomer with fully synthetic 5W-30 engine oil (contact pressure = 0.5 MPa).

| | Dynamic COF | |
|---|---|---|
| | Average | Range |
| 1000 | 0.35 | 0.34-0.36 |
| 2000 | 0.32 | 0.31-0.33 |
| rpm (descending) | | |
| 1000 | 0.32 | 0.31-0.32 |
| 500 | 0.32 | 0.31-0.32 |
| 200 | 0.32 | 0.31-0.32 |
| 100 | 0.33 | 0.32-0.33 |
| 50 | 0.35 | 0.34-0.35 |
| 20 | 0.37 | 0.36-0.37 |

TABLE 6

Comparative Example 2 - FKM elastomer with fully synthetic 5W-30 engine oil (contact pressure = 0.2 MPa).

| | Dynamic COF | |
|---|---|---|
| | Average | Range |
| rpm (ascending) | | |
| 10 | 0.55 | 0.50-0.60 |
| 20 | 0.50 | 0.49-0.51 |
| 50 | 0.46 | 0.44-0.47 |
| 100 | 0.45 | 0.44-0.46 |
| 200 | 0.47 | 0.46-0.47 |
| 500 | 0.52 | 0.51-0.52 |
| 1000 | 0.53 | 0.52-0.54 |
| 2000 | 0.47 | 0.46-0.48 |
| rpm (descending) | | |
| 1000 | 0.48 | 0.48-0.49 |
| 500 | 0.46 | 0.46-0.47 |
| 200 | 0.45 | 0.44-0.46 |
| 100 | 0.45 | 0.44-0.46 |
| 50 | 0.47 | 0.45-0.48 |
| 20 | 0.52 | 0.51-0.52 |

It can be seen that the dynamic coefficient of friction of Comparative Example 2 is higher than that of Example 2 over a range of speeds and pressures.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A dynamic seal comprising:
   a body having a contact surface; and
   a coating comprising poly(norbornene) or a derivative thereof on the contact surface.

2. A dynamic seal having a contact surface comprising: poly(norbornene) or a derivative thereof,
   wherein the poly(norbornene) is provided in the form of a particulate.

3. The dynamic seal of claim 2, wherein a majority of the particles making up the particulate have a longest dimension of from 1 to 500 microns.

4. The dynamic seal of claim 2, wherein the particulate is fixed to the contact surface using an adhesive.

5. The dynamic seal of claim 4, wherein the adhesive comprises a cyanoacrylate adhesive and/or a water-based poly(urethane) adhesive.

6. The dynamic seal of claim 4, wherein the dynamic seal comprises an elastomer.

7. The dynamic seal of claim 6, wherein the elastomer is a fluoroelastomer.

8. A machine arrangement comprising: the dynamic seal of claim 2.

9. The dynamic seal of claim 2, wherein the particulate is at least partially embedded in the contact surface.

10. The dynamic seal of claim 1, wherein the body comprises an elastomer body.

11. The dynamic seal of claim 10, wherein the coating is attached to the elastomer body by an adhesive.

12. The dynamic seal of claim 11, wherein the adhesive comprises a cyanoacrylate adhesive and/or a water-based poly(urethane) adhesive.

13. The dynamic seal of claim 12, wherein the poly(norbornene) in the coating is in the form of a particulate.

14. The dynamic seal of claim 13, wherein a layer of the adhesive is present between the poly(norbornene) particulate and the elastomer body.

15. The dynamic seal of claim 1, wherein the coating is applied in a continuous circumferential strip along the contact surface.

16. A rolling element bearing comprising:
an inner ring;
an outer ring;
a plurality of rolling elements disposed between an outer surface of the inner ring and an inner surface of the outer ring; and
a dynamic seal comprising a body having a contact surface coated with poly(norbornene) or a derivative thereof, wherein the contact surface of the dynamic seal is arranged to be in sliding contact with the inner ring and/or outer ring.

17. The bearing of claim 16, wherein the contact surface of the dynamic seal is loaded with lubricant oil to lubricate the relative motion of the dynamic seal with either the inner ring or the outer ring.

18. The rolling element bearing of claim 16, wherein the body comprises an elastomer body.

19. The rolling element bearing of claim 18, wherein the coating is attached to the elastomer body by an adhesive.

20. The rolling element bearing of claim 19, wherein the poly(norbornene) in the coating is a particulate.

* * * * *